Oct. 18, 1932.  F. P. NICKERSON  1,882,864
METHOD OF AND APPARATUS FOR DISTRIBUTING MATERIALS
Filed Aug. 18, 1926  2 Sheets-Sheet 1
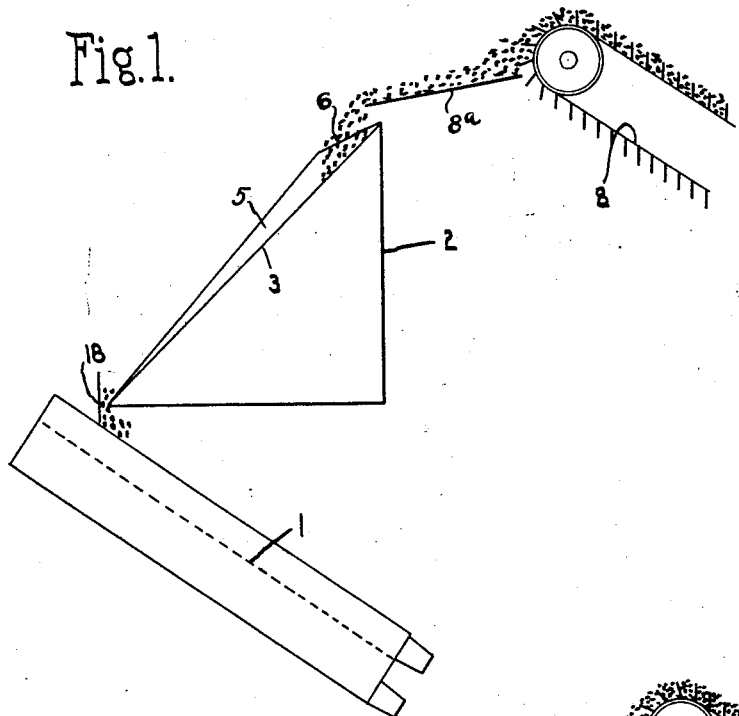
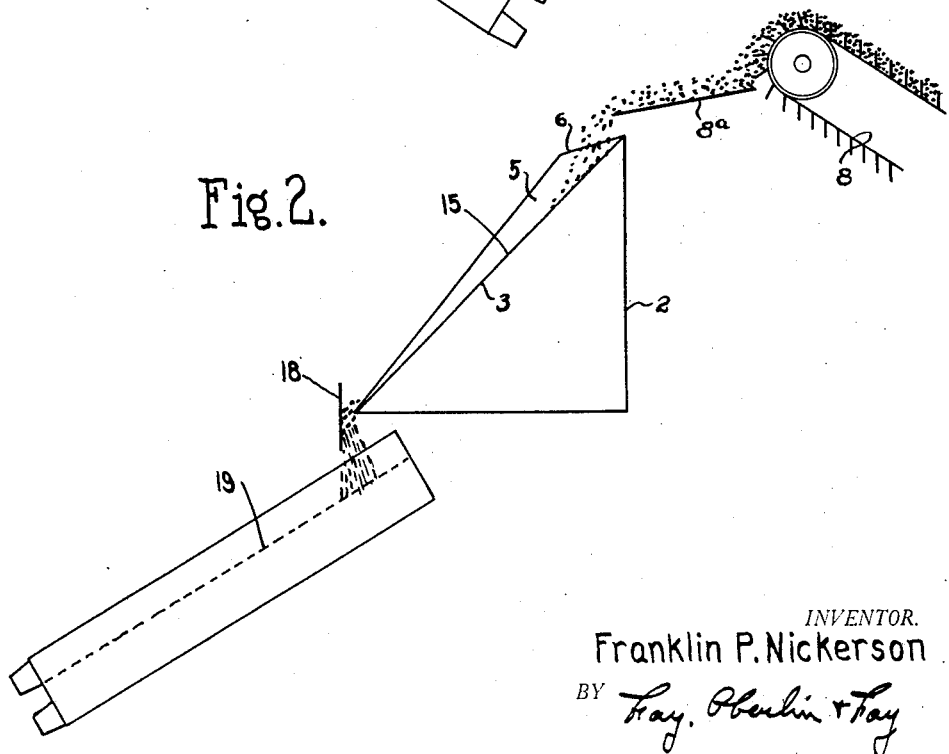
INVENTOR.
Franklin P. Nickerson
BY
ATTORNEYS.

Oct. 18, 1932.  F. P. NICKERSON  1,882,864
METHOD OF AND APPARATUS FOR DISTRIBUTING MATERIALS
Filed Aug. 18, 1926  2 Sheets-Sheet 2
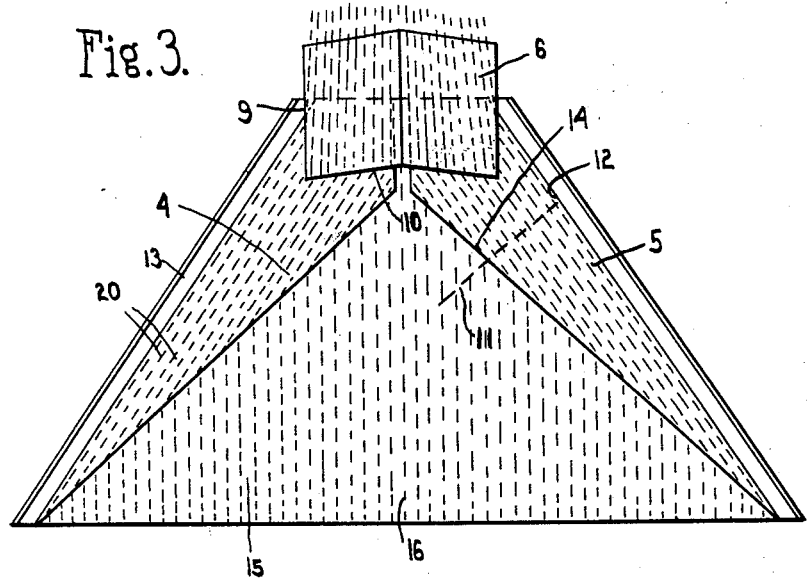
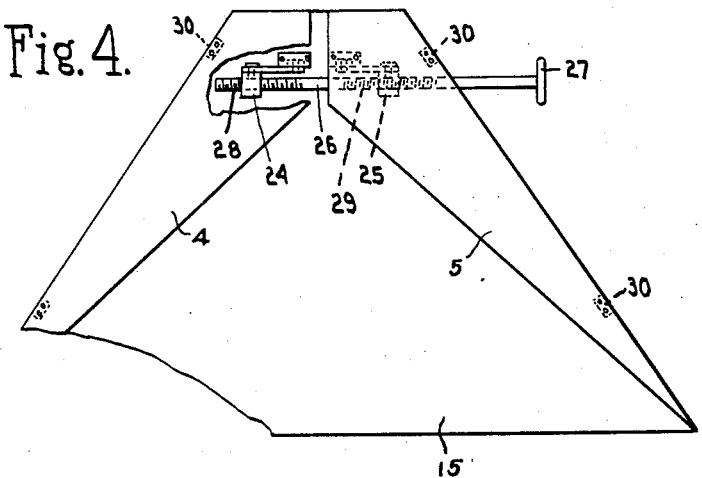
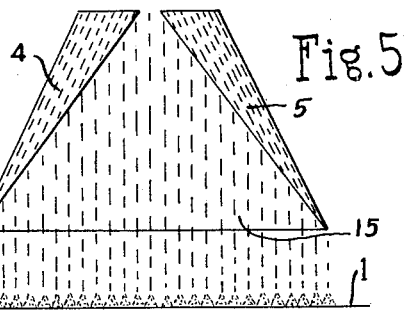
INVENTOR.
Franklin P. Nickerson
BY
ATTORNEYS.

Patented Oct. 18, 1932

1,882,864

UNITED STATES PATENT OFFICE

FRANKLIN P. NICKERSON, OF CLEVELAND, OHIO, ASSIGNOR TO THE W. S. TYLER COMPANY, OF CLEVELAND, OHIO, A CORPORATION OF OHIO

METHOD OF AND APPARATUS FOR DISTRIBUTING MATERIALS

Application filed August 18, 1926. Serial No. 129,977.

The present invention, relating, as indicated, to a method of and apparatus for distributing materials, is particularly directed to an extremely simple and effective means for receiving materials in bulk from various types of feeders, such as belts, elevators or the like, and then distributing this material evenly and uniformly over the surface of a chute discharging upon either inclined woven wire screens or other mechanism in which it is important to have uniform distribution of material. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:

Fig. 1 is a side elevation illustrating my improved method of distributing material onto a screen; Fig. 2 is a similar view illustrating a modification of the first method; Fig. 3 is a plan view of one form of my improved distributing means; Fig. 4 is a front elevation partially broken away to show one simple means for adjusting the distributing plates into proper position; and Fig. 5 is a view illustrating the manner in which the material is evenly distributed by the present method.

Various mechanisms have been constructed for distributing bulk material, most of these mechanisms being operating one where one or more elements are moved to convey the material across a screen or chute, but none of the mechanisms now in use are really effective to uniformly distribute the material regardless of the flow of the material into the distributing mechanism, and to, at the same time, keep the material distributing while passing through the distributing mechanism. In other words, many of the apparatuses now in use are unable to maintain an even distribution as the material flows through the mechanism even though at some point in its progress a uniform distribution is secured.

My improved method consists, briefly stated, in flowing material in bulk onto an inclined plate extending diagonally across the chute or element into which the material is to be fed and in position to cause the material to flow transversely of this chute or element while causing the material to fall from the plate at uniform intervals onto the surface of the chute.

Refering now to Fig. 1, there is shown an inclined woven wire screen 1 onto which the material is to be distributed. Mounted above the upper end of the screen 1 is a framework 2, in which is mounted an inclined chute 3 onto which material is distributed from two inclined plates 4 and 5. These plates extend diagonally upward at an angle to the surface of the chute 3 to a point slightly beneath a chute or spreading plate 6, onto which the material is discharged from any of the various mechanisms, such for example as an elevating mechanism 8, which is shown in Fig. 1. In Figs. 1 and 2 is illustrated a conveying chute 8a which forms no part of this invention but simply carries the material from the elevating mechanism 8 and discharges the same onto the mechanism comprising my invention. It will be noted that for various types of material the angle of inclination to the horizontal of the member 8a must be varied in order to permit the material to move thereover. The elevating mechanism and the plate 8a, however, form no part of this invention and any suitable means may be employed for discharging the material onto the apparatus comprising my invention.

The construction of the distributing mechanism proper is best shown in Figs. 1 and 3. The material is discharged onto the inclined roof-like plate 6 and discharges from the sides 9 and front edges 10 of the two portions of this plate onto the plates 4 and 5, the general construction of which will be evident from an inspection of these figures. These two plates, which extend diagonally upward from their lower corners and inward toward each other, substantially meet the center line of the roof 6 and are disposed at such an angle that a line 11 drawn at right angles to the inner edge 12 of the plate lies in a horizontal plane. As the material discharges from the roof 6 onto the plates 4 and 5 it flows down these plates in rows 20, all of which are parallel to the inner or fixed edge 12 of the plate which is disposed against the side of the box-like frame 13, in which the distributing mechanism is housed. As these rows of material flow down this plate in this parallel relation the outermost row first discharges off the edge 14 of the plate and on to the screen 1 therebelow. The chute 3 is inclined, as indicated in Fig. 1, to lie in a plane at an angle to the plane of each of the two plates 4 and 5 so that the material, as it strikes the portion 15 of the chute 3, continues downwardly with a change in its direction and flows straight downwardly along a path which is substantially parallel to the center line 16 of the chute 3. The outer edge 14 of each of the plates 4 and 5 is cut off to make an acute angle with the inner edge 12 of each plate so that the rows of material flowed down the plates 4 and 5 discharge successively off the staggered edge of these plates onto the plate 3, where all of these rows of material change their path and then flow also in substantially parallel lines down to the screen, the path of movement of all of these lines of material being substantially parallel to the center line 16 of the chute 3.

It will be obvious that by thus causing the material first to discharge from a conveyor elevator onto a roof-like plate consisting of two angularly related and inclined members, each discharge of material will at once be distributed partly to one side and partly to the other side of this roof. Each half of the discharge will then in turn be again divided, some flowing off the front and some off the side of each side of the roof and onto the inclined plates 4 and 5. By this time the material is already fairly well distributed and it is again redistributed very much more uniformly and evenly by being caused to drop off the staggered outer edges of the plates 4 and 5. It is thus distributed entirely over the surface of the chute portion 15, and as the material flows off from the lower end of this chute it is caused to strike a baffle 18 disposed in the path of movement of the material, thus causing the material to lose its velocity, and by rebounding against this plate to be still further distributed as it drops down with practically no velocity upon the upper end of either one or more inclined screens 1, or of course into other conveying passages in the event that the present method is desired to distribute material for other purposes than screening.

In Fig. 2 I have illustrated a slight modification of the present method and apparatus, in which the material flowing from the lower end of the chute portion 15 is also caused to strike the baffle 18, but is then discharged onto a screen 19 inclined in the opposite direction from the screen in Fig. 1, the screen 19 lying in a plane substantially parallel to the plane of the chute portion 15.

It is absolutely necessary, to secure the proper distribution, that the plates 4 and 5 be brought to an angular position which will cause the material to flow straight down these plates in courses parallel to the inner edge and thus at an angle to the outer edge. For this purpose adjusting means are provided, one form of which is shown in Fig. 4, for accurately positioning the two plates 4 and 5, this means consisting of threaded blocks 24 and 25 secured by universal connections to the lower sides of the two plates 4 and 5 and operating simultaneously by means of a shaft 26 carrying a hand wheel 27 and provided with right and left-hand threads 28 and 29 engaging respectively the threaded sockets of blocks 24 and 25. Rotation of the shaft in one direction will space the two plates, thus lifting them about their inner edges where they are secured by hinges 30 to the frame 13, while rotation in the opposite direction will lower the inner edges of the plates as they are allowed to approach each other.

It will be apparent that substantially any desired distribution of material can be accurately secured by changing the formation of the inner or adjacent free edges of the two plates 4 and 5. If a uniform distribution is desired then these plates may be made with straight inner edges as shown in Fig. 3, but if it is desired to concentrate a greater amount of material from one portion of the chute 15 than another this can be secured by cutting the inner edges of the plates along suitable curved lines which will cause a disproportionate discharge of material at different points along these inner edges.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A distributor for flowable materials comprising a pair of angularly related plates adapted to receive the discharge of such material from a bin, a base plate disposed beneath said angularly related plates, and a second pair of angularly related plates respectively hinged to said base plate and inclined downwardly and outwardly with respect to said first plates.

2. A distributor for flowable materials comprising an inclined base plate flared outwardly from its upper edge to its lower edge, and a pair of plates each hingedly supported at one edge adjacent the outer edges of said base plate, overlying the same and angularly related thereto, said plates adapted to receive a flow of material and distribute the same over portions of said base plate.

3. A distributor for flowable materials comprising an inclined base plate flared outwardly from its upper edge to its lower edge, a pair of distributing plates angularly related to said base plate and overlying the same, each hinged at one edge to said base plate, and means to adjust the angular relation of said plates to each other and to said base plate.

4. A distributor for flowable materials comprising an inclined base plate flared outwardly from its upper edge to its lower edge, a pair of angularly related plates adjustably secured to said base plate, and means to adjust the angular relation of said plates to each other and to said base plate, the lower edge of each of said adjustable plates being bevelled whereby said material is caused to flow first at angles to the long dimension of said base plate along said adjustable plates, and then to overflow the bevelled edges of said adjustable plates to flow parallel to said long dimension to the lower edge of said base plate.

5. In apparatus for distributing a relatively narrow stream of material into a uniform relatively wider stream, the combination of an inclined base plate for discharging the wider stream, and a pair of plates overlying said base plate, angularly related thereto and adapted to receive a portion of said localized stream and distribute the same evenly over a portion of said base plate.

6. In apparatus for distributing a relatively narrow stream of material into a uniform relatively wider stream, the combination of an inclined base plate for discharging the wider stream, a pair of plates overlying said base plate, annularly related thereto and adapted to receive a portion of said localized stream and distribute the same evenly over a portion of said base plate, and means to adjust the angular relation of said pair of plates to said base plate.

Signed by me, this 3rd day of August, 1926.

FRANKLIN P. NICKERSON.